(12) United States Patent  (10) Patent No.: US 8,149,344 B2
Kao  (45) Date of Patent: Apr. 3, 2012

(54) LIQUID CRYSTAL DISPLAY HAVING PARTICULAR CAPACITOR ELECTRODES

(75) Inventor: Yu-Chien Kao, Tainan County (TW)

(73) Assignee: Chimei Innolux Corporation, Miao-Li County (TW)

(*) Notice: Subject to any disclaimer, the term of this patent is extended or adjusted under 35 U.S.C. 154(b) by 467 days.

(21) Appl. No.: 12/487,770

(22) Filed: Jun. 19, 2009

(65) Prior Publication Data

US 2009/0316061 A1  Dec. 24, 2009

(30) Foreign Application Priority Data

Jun. 20, 2008  (TW) .............................. 97123190 A

(51) Int. Cl.
*G02F 1/1343* (2006.01)
*G02F 1/1339* (2006.01)

(52) U.S. Cl. ............. 349/38; 349/39; 349/153; 349/190

(58) Field of Classification Search .................... 349/38, 349/39, 153, 190

See application file for complete search history.

(56) References Cited

U.S. PATENT DOCUMENTS 7,170,576 B2 * 1/2007 Jun et al. ........................ 349/155
7,336,335 B2 * 2/2008 Takagi ........................... 349/155

* cited by examiner

*Primary Examiner* — Mike Qi

(74) *Attorney, Agent, or Firm* — Lowe Hauptman Ham & Berner LLP

(57) ABSTRACT

In a pixel array substrate, scan lines intersect data lines to define first to third sub-pixel regions. First to third conductive parts are respectively disposed in the first to third sub-pixel regions. First to third capacitor electrodes are respectively disposed over the first to third conductive parts to form pixel storage capacitors. A spacer is disposed over the third capacitor electrode. At least one of a shape or a size of the third capacitor electrode is different from that of the first or second capacitor electrode.

20 Claims, 8 Drawing Sheets

LIQUID CRYSTAL DISPLAY HAVING PARTICULAR CAPACITOR ELECTRODES

This application claims the benefit of Taiwan application Serial No. 97123190, filed Jun. 20, 2008, the subject matter of which is incorporated entirely herein by reference.

BACKGROUND

1. Technical Field

The disclosure relates in general to a liquid crystal display and a pixel array substrate thereof, and more particularly, to a liquid crystal display capable of preventing flickering, and a pixel array substrate thereof.

2. Description of the Related Art

FIG. 1 is a schematic illustration showing a circuit of a conventional liquid crystal display (LCD) with thin film transistors (TFTs). In FIG. 1, thin film transistors $TFT_{10A}$, $TFT_{10B}$, $TFT_{10C}$..., which are contained in sub-pixels $SP_{10A}$, $SP_{10B}$, $SP_{10C}$... on the same row, are driven by the same scan line S10. One main pixel is usually composed of three sub-pixels. For example, one main pixel capable of displaying any desired color is usually composed of red, green and blue sub-pixels. When the scan line S10 provides the sufficient turn-on voltage, the thin film transistors $TFT_{10A}$, $TFT_{10B}$, $TFT_{10C}$... connected to the scan line S10 are turned on such that the data (voltage levels) carried by data lines D10 can be written into the sub-pixels $SP_{10A}$, $SP_{10B}$, $SP_{10C}$.... After the above-mentioned writing operation is finished, the thin film transistors $TFT_{10A}$, $TFT_{10B}$, $TFT_{10C}$... are turned off, and the voltage level of the pixel electrode in each of the sub-pixels $SP_{10A}$, $SP_{10B}$, $SP_{10C}$ ... is held through a liquid crystal capacitor $C_{LC}$ and a pixel storage capacitor $C_{ST}$.

However, when the thin film transistors $TFT_{10A}$, $TFT_{10B}$, $TFT_{10C}$ ... are turned off, the voltage level of the pixel electrode in each of the sub-pixels $SP_{10A}$, $SP_{10B}$, $SP_{10C}$ ... tends to be influenced by the changes of other ambient voltages and thus fluctuates. This voltage fluctuation amount is referred to as a "feed-through voltage", $V_{FD}$, which may be represented in the following Equation (1):

$$V_{FD} = [C_{GD}/(C_{LC} + C_{ST} + C_{GD})] \times \Delta V_G \quad (1)$$

where $C_{LC}$ represents the liquid crystal capacitor, $C_{ST}$ represents the pixel storage capacitor, $C_{GD}$ represents the capacitor between the gate and the drain of the thin film transistor, and $\Delta V_G$ represents the voltage difference between the voltages of the scan line when the thin film transistor is turned on and off.

According to the operational principle of the known liquid crystal display, rotation angles of liquid crystal molecules vary with changes in the intensity of the electric field applied to the liquid crystal molecules so that various gray levels may be displayed. The intensity of the electric field applied to the liquid crystal molecules is determined according to the voltage difference between the pixel electrode of each sub-pixel and the common electrode. Thus, when the voltage level of the pixel electrode of the sub-pixel is influenced by the feed-through voltage $V_{FD}$ and thus changed, there is a deviation of the gray level actually displayed by the sub-pixel from the desired gray level to be displayed, thereby flickering occurs and the display quality of the known liquid crystal display is influenced. Fortunately, the feed-through voltages $V_{FD}$ of one sub-pixel only slightly differ from another, therefore, this drawback may be solved by performing overall compensations on the driving voltage levels of the sub-pixels when the display signals are inputted.

Generally speaking, many spacers are usually disposed between a pixel array substrate (i.e., the substrate that contains TFTs) and an opposing substrate, which are paired with liquid crystal material sandwiched in between to constitute a liquid crystal display panel, so as to maintain the desired cell gap between the substrates. The spacers usually only need to be disposed over the pixel storage capacitor of one sub-pixel of every pixel, and are usually made of photosensitive resin and formed on the surface of the opposing substrate by way of photo-lithography. Such spacers are also referred to as photo spacers (PSs).

FIG. 2 is a top view showing a pixel array of a TFT LCD known to the inventor(s). As shown in FIG. 2, in the pixel array composed of sub-pixels $SP_{20A}$, $SP_{20B}$, $SP_{20C}$ for each pixel, there is provided a common line C20 penetrating through the sub-pixels. The common line C20 and a capacitor electrode, which is electrically connected to the pixel electrode $E_{20A}$, $E_{20B}$, $E_{20C}$ of each sub-pixel, are capacitively coupled to each other and function as a pixel storage capacitor $C_{ST}$ while a common voltage or a desired level voltage is written into the common line C20. Recent developments in mobile communications emphasize customer demands for small-size, high-resolution LCD products. Thus, the size of each sub-pixel has to be reduced according to this trend. However, the photo spacer, e.g., photo spacer 10 located in sub-pixel $SP_{20C}$ of the pixel shown in FIG. 2, still has to maintain the predetermined width or diameter to ensure its function of supporting and maintaining the cell gap between the opposing substrates. Therefore, the capacitor electrode $E_{20C}$, which supports the photo spacer 10 and is for shielding display defects associated with disclination caused by the disordered liquid crystal molecules around the photo spacer 10, needs to have a predetermined size that is usually greater than the width of the common line C20 in a high-resolution, small-size LCD product. Thus, the widths of the common line C20 of the sub-pixel $SP_{20C}$ and the capacitor electrode $E_{20C}$ have to be properly enlarged so that the spacer 10 can be disposed thereon. However, in order to unify the capacitances of the storage capacitors $C_{ST}$ of the sub-pixels and thus maintain the relationship among the feed-through voltages of the sub-pixels, i.e. $V_{FD-A} \approx V_{FD-B} \approx V_{FD-C}$, and further to avoid flickering by driving voltage compensation, even in the other two sub-pixels, i.e., $SP_{20A}$, $SP_{20B}$, where no spacer is disposed, the areas of two capacitor electrodes $E_{20A}$ and $E_{20B}$ also have to be correspondingly enlarged. Consequently, in the sub-pixels $SP_{20A}$, $SP_{20B}$ and $SP_{20C}$, the relationship of the feed-through voltages $V_{FD-A} \approx V_{FD-B} \approx V_{FD-C}$ can be maintained by obtaining $C_{ST-A} = C_{ST-B} = C_{ST-C}$, with, however, sacrifices in the aperture ratios of the other sub-pixels ($SP_{20A}$, $SP_{20B}$) where no spacer is disposed. Thus, the overall display brightness is reduced, and the display quality and the product performance are significantly influenced.

SUMMARY

According to an aspect, a liquid crystal display including a pixel array substrate, a spacer, an opposing substrate and a liquid crystal layer is provided. The pixel array substrate includes a substrate, a plurality of scan lines, a plurality of data lines, a plurality of conductive layers, a plurality of capacitor electrodes and a plurality of transistors. The scan lines intersect the data lines on the substrate to define a plurality of sub-pixel regions including, for each pixel of the display, a first sub-pixel region, a second sub-pixel region and a third sub-pixel region. A patterned conductive layer formed on the substrate includes a first conductive part, a second conductive part and a third conductive part respectively disposed in the first sub-pixel region, the second sub-pixel region and the third sub-pixel region. The capacitor electrodes include a first capacitor electrode, a second capacitor electrode and a third capacitor electrode respectively disposed over the first conductive part, the second conductive part and the third conductive part to form first, second and third pixel storage capacitors. At least one of (i) a shape or (ii) a maximum width of the third capacitor electrode as measured across a length-wise direction of the patterned conductive layer is different from that of the first capacitor electrode or the second capacitor electrode. The spacer is disposed over the capacitor electrode in the third sub-pixel region. The opposing substrate is disposed on the spacer. The liquid crystal layer is filled in between the opposing substrate and the pixel array substrate.

According to another aspect, a liquid crystal display comprises a pixel array substrate, a spacer, an opposing substrate and a liquid crystal layer is provided. The pixel array substrate includes a substrate, a plurality of scan lines, a plurality of data lines, a plurality of conductive layers, a plurality of capacitor electrodes and a plurality of transistors. The scan lines intersect the data lines on the substrate to define a plurality of sub-pixel regions including, for each pixel of the display, a first sub-pixel region, a second sub-pixel region and a third sub-pixel region. The first, second and third sub-pixel regions comprise first, second and third conductive parts, respectively. The capacitor electrodes include a first capacitor electrode, a second capacitor electrode and a third capacitor electrode respectively disposed over the first conductive part, the second conductive part and the third conductive part to form first, second and third pixel storage capacitors. At least one of a shape or a size of the third capacitor electrode is different from that of the first capacitor electrode or the second capacitor electrode. The spacer is disposed over the capacitor electrode in the third sub-pixel region. The opposing substrate is disposed on the spacer. The liquid crystal layer is filled in between the opposing substrate and the pixel array substrate.

According to a further aspect, a liquid crystal display comprises a pixel array substrate, a spacer, an opposing substrate and a liquid crystal layer is provided. The pixel array substrate includes a substrate, a plurality of scan lines, a plurality of data lines, a plurality of conductive layers, a plurality of electrodes and a plurality of transistors. The scan lines intersect the data lines on the substrate to define a plurality of sub-pixel regions including, for each pixel of the display, a first sub-pixel region, a second sub-pixel region and a third sub-pixel region. A patterned conductive layer formed on the substrate includes a first conductive part, a second conductive part and a third conductive part respectively disposed in the first sub-pixel region, the second sub-pixel region and the third sub-pixel region. The electrodes include a first electrode, a second electrode and a third electrode respectively disposed over the first conductive part, the second conductive part and the third conductive part to form first, second and third pixel storage capacitors. A shape of the third electrode is different from that of the first electrode or the second electrode. The spacer is disposed over the capacitor electrode in the third sub-pixel region. The opposing substrate is disposed on the spacer.

DETAILED DESCRIPTION

The disclosure relates to a pixel array substrate and a liquid crystal display. Under the precondition of the maximum aperture ratio in one or more configurations, feed-through voltages in several sub-pixel regions are adjusted to be substantially the same to prevent the problem of flickering. Several embodiments will be described with reference to the accompanying drawings without restricting the scope of the disclosure.

First Embodiment

Figure 3:
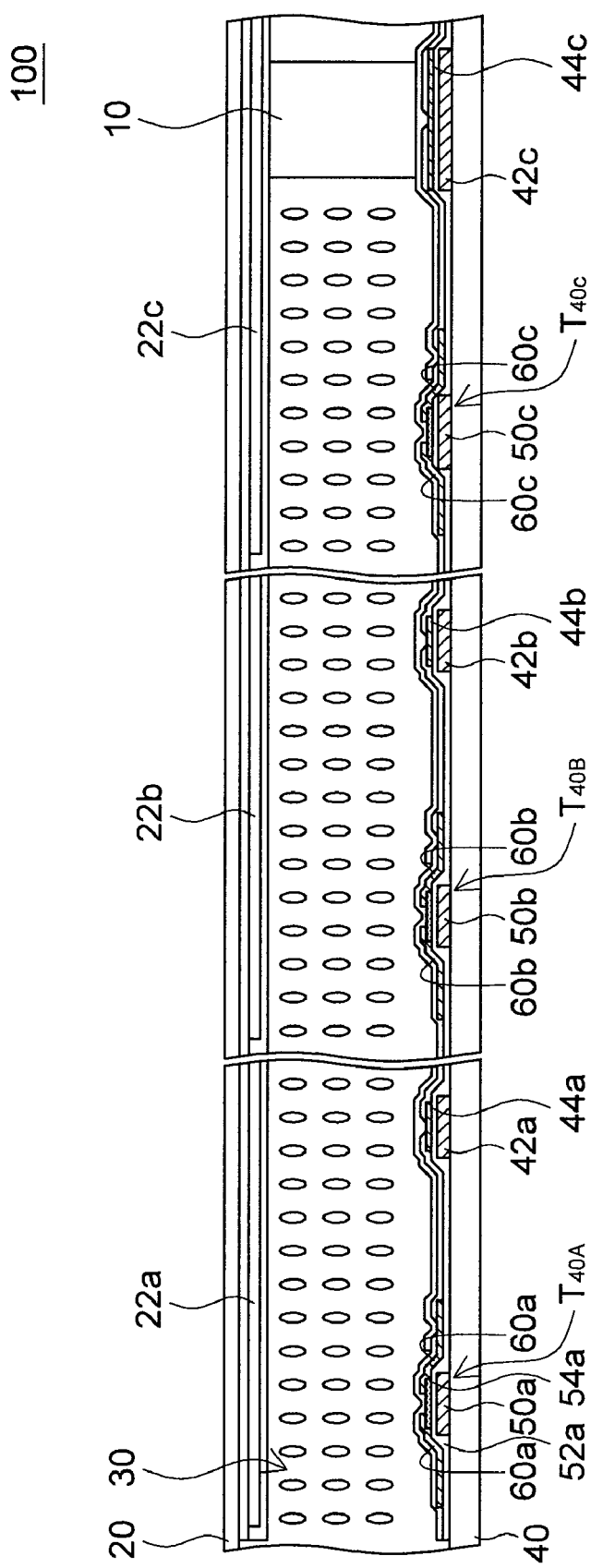
FIG. 3 is a cross-sectional view showing a liquid crystal display according to a first embodiment.

FIG. 3 is a cross-sectional view showing a liquid crystal display 100 according to a first embodiment. In FIG. 3, the liquid crystal display 100 of this embodiment includes a pixel array substrate 40, an opposing substrate 20, and a liquid crystal layer 30. A spacer 10 is disposed, in each pixel, on a surface of the opposing substrate 20 facing the pixel array substrate 40, and is in contact with the pixel array substrate 40 such that the pixel array substrate 40 is spaced from the opposing substrate 20 by a fixed gap, and the liquid crystal layer 30 may be filled into the gap and distributed between the opposing substrate 20 and the pixel array substrate 40. The spacer 10, in one or more configurations, is made of a photosensitive resin and formed by way of photo-lithography. Other materials and/or forming methods for such spacers are not excluded.

Figure 4:
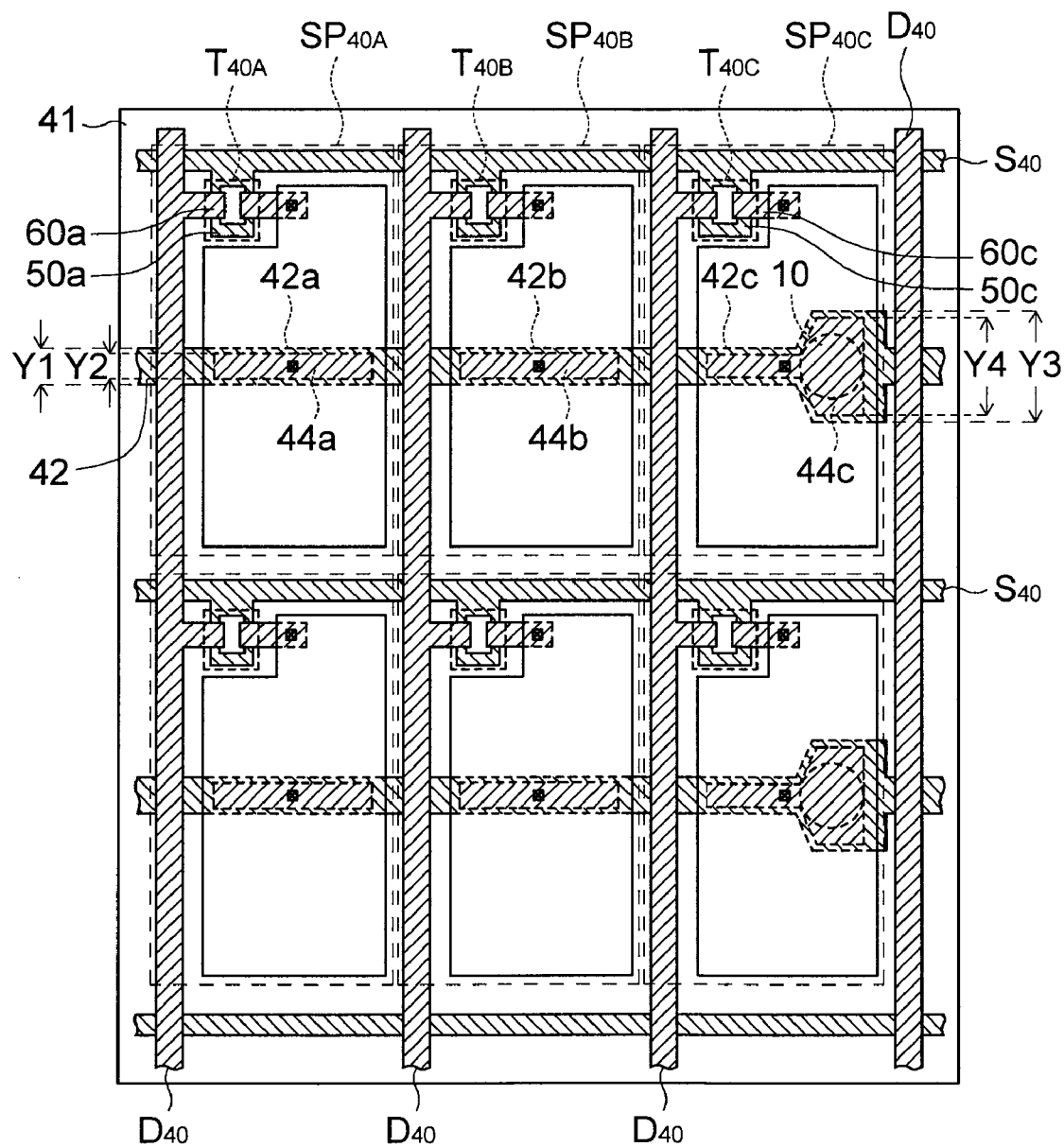
FIG. 4 is a top view showing a pixel array substrate according to the first embodiment.

FIG. 4 is a top view showing the pixel array substrate 40 according to the first embodiment. In FIG. 4, a plurality of scan lines S40 and a plurality of data lines D40 are formed on a substrate 41 made of, e.g., glass, and the scan lines S40 vertically intersect the data lines D40 to define several sub-pixel regions ($SP_{40A}$, $SP_{40B}$, $SP_{40C}$, . . . ) including the first sub-pixel region $SP_{40A}$, the second sub-pixel region $SP_{40B}$ and the third sub-pixel region $SP_{40C}$. Generally speaking, two or more sub-pixels constitute a pixel. In one or more configurations, three sub-pixels constitute a pixel (however, it is not excluded that each pixel includes more than three sub-pixels). A color frame of the liquid crystal display 100 is composed of, e.g., three primary colors, e.g.: red, blue and green primary colors. Thus, the sub-pixels are arranged correspondingly with respect to the red, blue and green color filter layers on the opposing substrate 20, and each sub-pixel is for displaying one primary color. In addition, the gray level of each sub-pixel may be changed individually such that the respective pixel can display various colors. In an exemplary configuration, the sub-pixel regions $SP_{40A}$, $SP_{40B}$ and $SP_{40C}$ display the red, green and blue primary colors, respectively.

Several transistors (e.g., Thin Film Transistors, TFTs) $T_{40A}$, $T_{40B}$, $T_{40C}$, . . . are formed in the sub-pixel regions $SP_{40A}$, $SP_{40B}$, $SP_{40C}$, . . . respectively. In particular, the transistors include the first transistor $T_{40A}$, the second transistor $T_{40B}$ and the third transistor $T_{40C}$, which are respectively formed in the first sub-pixel region $SP_{40A}$, the second sub-pixel region $SP_{40B}$ and the third sub-pixel region $SP_{40C}$. As shown in FIG. 3, the transistors $T_{40A}$, $T_{40B}$, $T_{40C}$ . . . have similar structures. Taking the first transistor $T_{40A}$ as an example, a channel layer 54a and a gate insulating layer 52a are covered on a gate 50a, while drains 60a are formed on the channel layer 54a, insulated from each other, and disposed on the gate 50a.

In FIGS. 3 and 4, a patterned conductive layer 42 is formed on the glass substrate 41 to serve as a common line, and the patterned conductive layer 42 includes a first conductive part 42a, a second conductive part 42b and a third conductive part 42c, which are respectively disposed in the first sub-pixel region $SP_{40A}$, the second sub-pixel region $SP_{40B}$ and the third sub-pixel region $SP_{40C}$, as exemplarily shown in FIG. 4. A shape of the third conductive part 42c is different from that of each of the first conductive part 42a and the second conductive part 42b, and a maximum width Y3 of the third conductive part 42c as measured perpendicular to a length-wise direction of the patterned conductive layer 42 is greater than a corresponding maximum width Y1 of each of the first conductive part 42a and the second conductive part 42b.

In FIGS. 3 and 4, a plurality of capacitor electrodes, including a first capacitor electrode 44a, a second capacitor electrode 44b and a third capacitor electrode 44c, are respectively disposed over the first conductive part 42a, the second conductive part 42b and the third conductive part 42c. The capacitor electrodes 44a, 44b and 44c are capacitively coupled to the conductive parts 42a, 42b and 42c with the gate insulating layer 52 interposed therebetween, so as to form a plurality of pixel storage capacitors $C_{ST-A}$, $C_{ST-B}$ and $C_{ST-C}$ (not numbered in the drawings). In one or more configurations, as exemplarily shown in FIG. 4, a maximum width Y4 of the third capacitor electrode 44c as measured perpendicular to the length-wise direction of the common line 42 is greater than a corresponding maximum width Y2 of each of the first capacitor electrode 44a and the second capacitor electrode 44b. In one or more configurations, the maximum lengths of the capacitor electrodes 44a, 44b and 44c, as measured along the length-wise direction of the common line 42, are substantially the same. However, the ratio between the maximum width and the maximum length of the third capacitor electrode 44c is greater than those of the first capacitor electrode 44a and the second capacitor electrode 44b. Consequently, an even surface with a sufficient space is provided over a portion of the third capacitor electrode 44c to support the spacer 10.

In one or more configurations, the patterned conductive layer 42 and the spacer 10 both are made of opaque materials, such as metal, although other materials are not excluded. In order to increase the aperture ratio of the pixel array substrate 40, in the third sub-pixel region (blue color) $SP_{40C}$ for placing the spacer 10, merely enlarging partial areas, corresponding to the spacer 10, of the capacitor electrode 44c and the third conductive part 42c, is sufficient to properly support the spacer 10 and shield display defects due to disclination. On the other hand, the areas of the capacitor electrodes 44a and 44b of the other sub-pixels ($SP_{40A}$ and $SP_{40B}$) are kept unchanged and substantially the same. Likewise, the areas of the conductive parts 42a, 42b are substantially the same and kept unchanged. Because the human eyes are less sensitive to the blue color, the influence, which is caused by the condition that the aperture ratio of the blue sub-pixel is lower than that of each of the red and green sub-pixels, on the display performance may be minimized.

Figure 5:
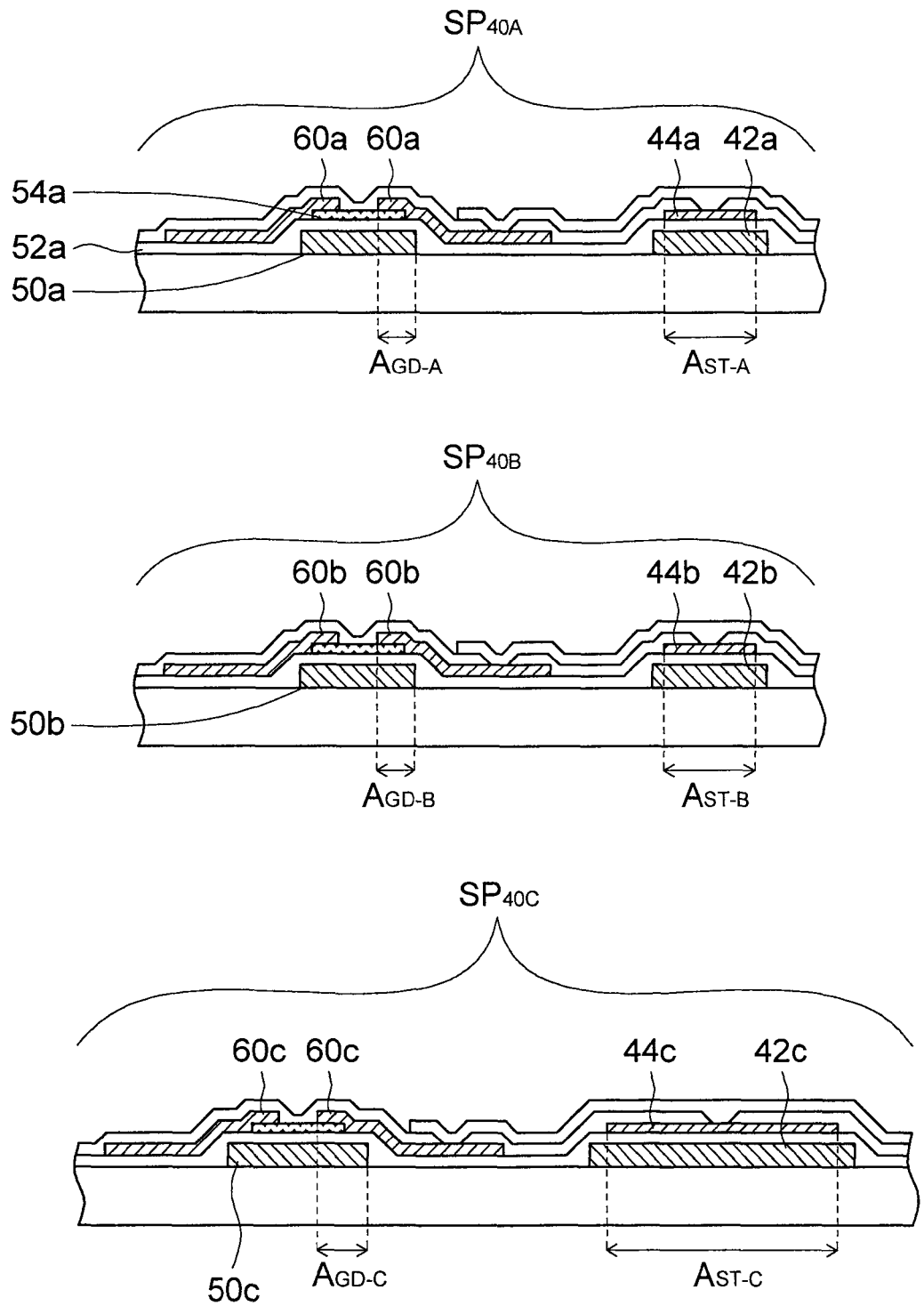
FIG. 5 is a cross-sectional view showing the pixel array substrate according to the first embodiment.

FIG. 5 is a cross-sectional view showing the pixel array substrate 40 according to the first embodiment. As shown in FIG. 5, a coupled area $A_{ST-C}$ between the third capacitor electrode 44c and the third conductive part 42c is larger than a coupled area $A_{ST-B}$ between the second capacitor electrode 44b and the second conductive part 42b. The coupled area $A_{ST-C}$ is also larger than a coupled area $A_{ST-A}$ between the first capacitor electrode 44a and the first conductive part 42a. Because the capacitance is directly proportional to the coupled area, while other conditions being the same, the storage capacitor $C_{ST-C}$ of the third sub-pixel region is greater than the storage capacitor $C_{ST-A}$ of the first sub-pixel region as well as the storage capacitor $C_{ST-B}$ of the second sub-pixel region. That is, the pixel storage capacitors $C_{ST}$ in the sub-pixel regions $SP_{40A}$, $SP_{40B}$ and $SP_{40C}$ satisfy the relationships of $C_{ST-A} < C_{ST-C}$ and $C_{ST-B} < C_{ST-C}$.

In one or more configurations, the coupled area $A_{ST-B}$ is equal to the coupled area $A_{ST-A}$. Consequently, the storage capacitor $C_{ST-A}$ of the first sub-pixel region is equal to the storage capacitor $C_{ST-B}$ of the second sub-pixel region, and the storage capacitor $C_{ST-A}$ or $C_{ST-B}$ of each of the first and second sub-pixel regions is smaller than the storage capacitor $C_{ST-C}$ of the third sub-pixel region. The pixel storage capacitors $C_{ST}$ in the sub-pixel regions $SP_{40A}$, $SP_{40B}$ and $SP_{40C}$ satisfy the relationship of $C_{ST-A} = C_{ST-B} < C_{ST-C}$.

As shown in Equation (1) above, the feed-through voltage (VFD) may be represented as:

$$V_{FD} = [C_{GD}/(C_{LC}+C_{ST}+C_{GD})] \times \Delta V_G \quad (1)$$

wherein $C_{LC}$ is the liquid crystal capacitor, $C_{ST}$ is the pixel storage capacitor, $C_{GD}$ is the capacitor between the gate and the drain of the thin film transistor, and $\Delta V_G$ is the voltage difference between the voltages of the scan line when the thin film transistor is turned on and off.

Figure 1:
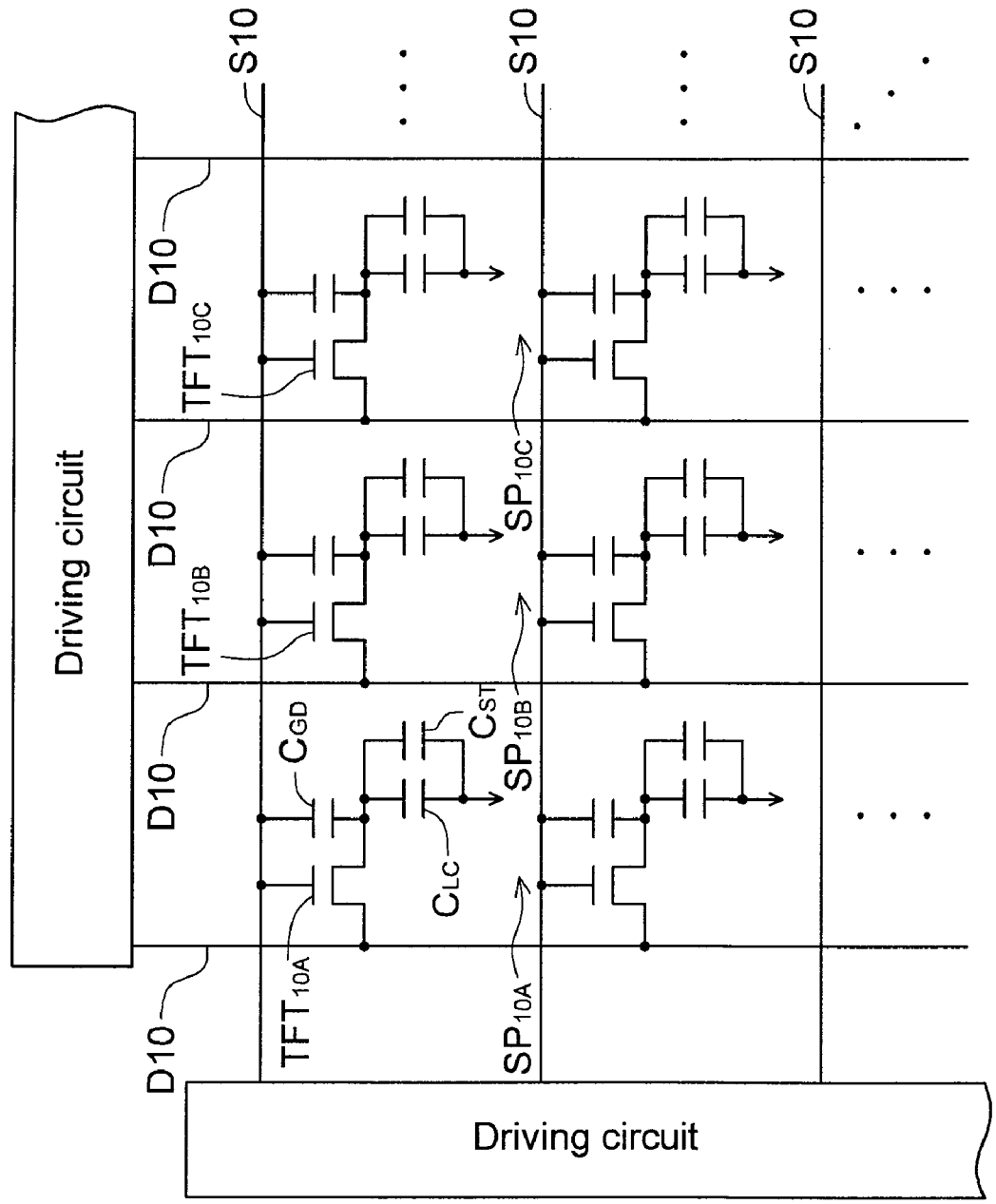
FIG. 1 is a schematic illustration showing a circuit of a conventional liquid crystal display (LCD) with thin film transistors (TFTs).
Figure 2:
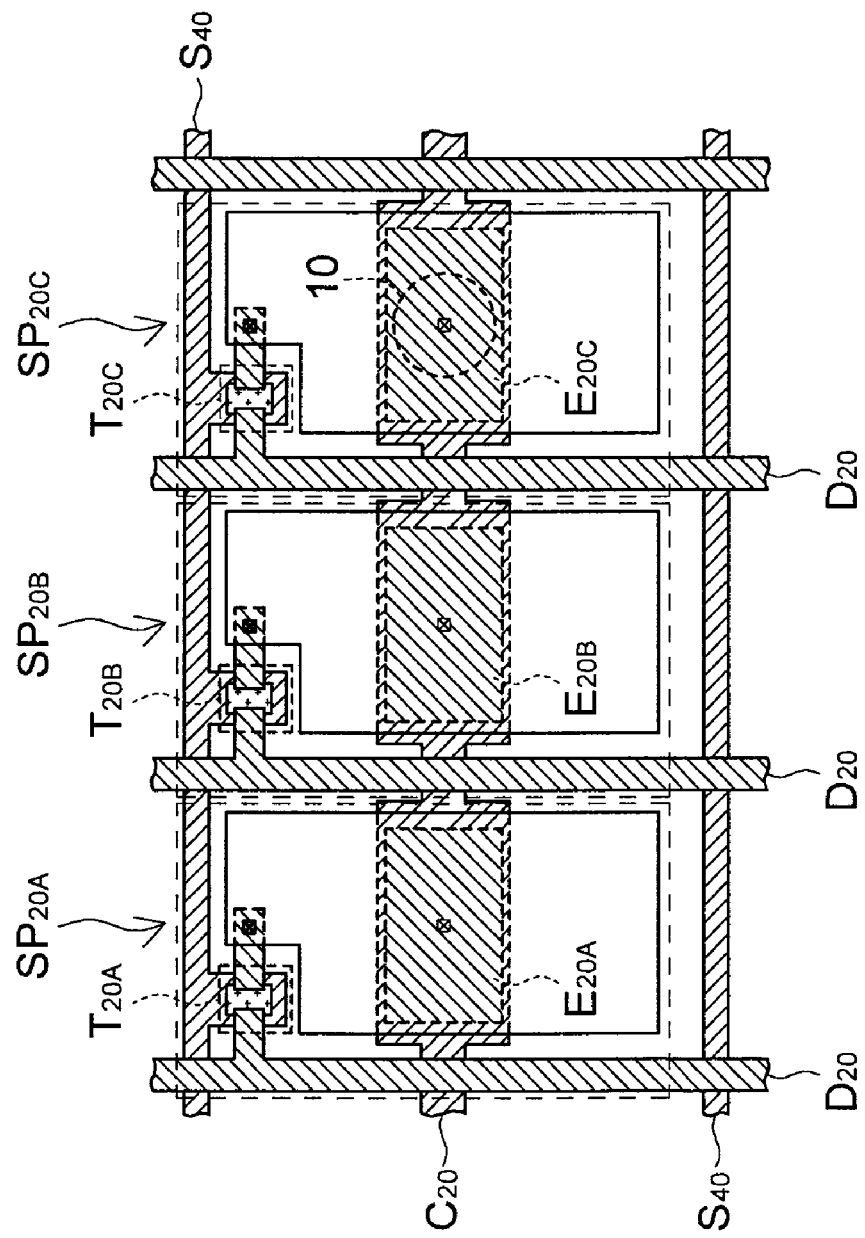
FIG. 2 is a top view showing a pixel array of a TFT LCD known to the inventor(s).

As for a typical liquid crystal display, the condition of $C_{GD} \ll C_{LC}+C_{ST}$ exists. Assume that $\Delta V_G$ and $C_{LC}$ are held at predetermined conditions. As can be seen from Equation (1), when the pixel storage capacitors $C_{ST}$ in the sub-pixel regions $SP_{40A}$ and $SP_{40C}$ already satisfy the relationship of $C_{ST-A} < C_{ST-C}$, by adjusting the coupled areas $A_{GD-A}$ and $A_{GD-C}$ of the respective drains 60a, 60c and the respective gates 50a, 50c, the capacitors $C_{GD}$ between the respective drains and gates of the transistors $T_{40A}$, $T_{40C}$ can be adjusted to establish the relationship of $C_{GD-A} < C_{GD-C}$, and allow the feed-through voltages in the first and third sub-pixel regions $SP_{40A}$, $SP_{40C}$ to satisfy the relationship of $V_{FD-A} \approx V_{FD-C}$. Similarly, when the pixel storage capacitors $C_{ST}$ in the sub-pixel regions $SP_{40B}$ and $SP_{40C}$ already satisfy the relationship of $C_{ST-B} < C_{ST-C}$, by adjusting $A_{GD-B}$ and $A_{GD-C}$, the capacitors $C_{GD}$ between the respective drains and gates of the transistors $T_{40B}$, $T_{40C}$ can be adjusted to establish the relationship of $C_{GD-B} < C_{GD-C}$, and allow the feed-through voltages in two sub-pixel regions $SP_{40B}$, $SP_{40C}$ to satisfy the relationship of $V_{FD-B} \approx V_{FD-C}$. Consequently, this embodiment can unify the feed-through voltages of the sub-pixels by adjusting the capacitor $C_{GD}$ between the gate and the drain of one or more of the transistors. As discussed above with respect to the liquid crystal display known to the inventor(s) as illustrated in FIG. 2, in order to unify the capacitors $C_{ST}$ of the sub-pixels, the coupled areas between the capacitor electrode and the common line in the other two sub-pixels without a spacer disposed thereon also have to be enlarged as in the sub-pixel with the spacer 10 such that each capacitor of the other two sub-pixels is substantially the same as the capacitors $C_{ST}$ of the sub-pixel with the spacer 10, thereby sacrificing the overall aperture ratio. As compared with the liquid crystal display known to the inventor(s) as illustrated in FIG. 2, the liquid crystal display of this embodiment not only can lower flickering but also has a larger aperture ratio, thereby enhancing the brightness and the quality of the displayed frame.

In particular, there are at least two ways of making the capacitors $C_{GD}$ between the respective drains and gates of the transistors $T_{40A}$ and $T_{40C}$ to satisfy the relationship of $C_{GD-A}<C_{GD-C}$. The first method is that if the storage capacitor $C_{ST-C}$ has to be M times of $C_{ST-A}$, the capacitor $C_{GD-C}$ is proportionally adjusted to be M times of $C_{GD-A}$, while $C_{GD-A}$ is not adjusted, so that the feed-through voltage $V_{FD-C}$ remains substantially the same as the feed-through voltage $V_{FD-A}$. In this way, the capacitor $C_{GD-A}$ is made M times smaller than the capacitor $C_{GD-C}$. The second method is that if the storage capacitor $C_{ST-C}$ is similarly to be M times of $C_{ST-A}$, the capacitor $C_{GD-A}$ is proportionally adjusted to be 1/M times of $C_{GD-C}$, while $C_{GD-C}$ is not adjusted, so that the feed-through voltage $V_{FD-A}$ of the first sub-pixel region is reduced to be substantially equal to the feed-through voltage $V_{FD-C}$ of the third sub-pixel region. Either of the two ways can in the end make the capacitor $C_{GD-A}$ to be smaller than the capacitor $C_{GD-C}$, and make $V_{FD-A} \approx V_{FD-C}$. Alternatively, both $C_{GD-C}$ and $C_{GD-A}$ can be adjusted to satisfy the desired relationship $V_{FD-A} \approx V_{FD-C}$.

Similarly, it is also possible to make the capacitors $C_{GD-B}$ and $C_{GD-C}$ to satisfy the relationship of $C_{GD-B}<C_{GD-C}$ and make $V_{FD-B} \approx V_{FD-C}$.

In particular, the ways and trends of adjusting the capacitor $C_{GD}$ between the drain and the gate of the respective transistor in the respective sub-pixel region are substantially the same as those of adjusting the pixel storage capacitor $C_{ST}$. The capacitances of the capacitors $C_{GD}$, which are defined by the overlapping sections of the gates 50a, 50b, 50c, . . . and the respective drains 60a, 60b, 60c, . . . in the transistors $T_{40A}$, $T_{40B}$, $T_{40C}$, . . . , are directly proportional to the coupled areas $A_{GD-A}$, $A_{GD-B}$, $A_{GD-C}$, . . . between the respective drains and gates. In order for the capacitors $C_{GD}$ between the respective drains and gates of the sub-pixel regions $SP_{40A}$, $SP_{40B}$ and $SP_{40C}$ to satisfy the relationship of $C_{GD-B}<C_{GD-C}$ or $C_{GD-A}<C_{GD-C}$, the coupled area $A_{GD-C}$ between the drain 60c and the gate 50c of the third transistor $T_{40C}$ is adjusted to be larger than the coupled area $A_{GD-B}$ between the drain 60b and the gate 50b of the second transistor $T_{40B}$, as shown in FIGS. 3 and 5, and the coupled area $A_{GD-C}$ is adjusted to be larger than the coupled area $A_{GD-A}$ between the drain 60a and the gate 50a of the first transistor $T_{40A}$.

In one or more configurations, when the pixel storage capacitors $C_{ST}$ in the sub-pixel regions $SP_{40A}$, $SP_{40B}$ and $SP_{40C}$ satisfy the relationship of $C_{ST-A}=C_{ST-B}<C_{ST-C}$, the capacitors $C_{GD}$ between the respective drains and gates in the sub-pixel regions $SP_{40A}$, $SP_{40B}$ and $SP_{40C}$ in this embodiment also correspondingly satisfy the relationship of $C_{GD-A}=C_{GD-B}<C_{GD-C}$. At this time, the coupled area $A_{GD-B}$ between the drain 60b and the gate 50b of the second transistor $T_{40B}$ is substantially equal to the coupled area $A_{GD-A}$ between the drain 60a and the gate 50a of the first transistor $T_{40A}$, and both of them are smaller than the coupled area $A_{GD-C}$, as shown in FIG. 5.

In particular, the opposing substrate 20 in accordance with one or more configurations of this embodiment further includes a red filter layer (R) 22a, a green filter layer (G) 22b and a blue filter layer (B) 22c. When the opposing substrate 20 is assembled with the pixel array substrate 40, the red filter layer 22a, the green filter layer 22b and the blue filter layer 22c respectively correspond to the first sub-pixel region $SP_{40A}$, the second sub-pixel region $SP_{40B}$ and the third sub-pixel region $SP_{40C}$, as shown in FIGS. 3 and 5. The spacer 10 is disposed, in accordance with a specific configuration, in the third sub-pixel region $SP_{40C}$ corresponding to the blue filter layer 22c. Because the human eyes are less sensitive to the blue color, the influence on the overall display quality is the least even though the aperture ratio of the third sub-pixel region is smaller than the aperture ratios of the other sub-pixel regions.

Second Embodiment

The difference between the second and first embodiments resides in the way for unifying the feed-through voltages, especially for unifying the feed-through voltages by changing the shape(s) of the capacitor electrode(s) rather than by changing the coupled area(s) of the storage capacitor(s), while still providing a sufficient space for the spacer(s).

Figure 6:
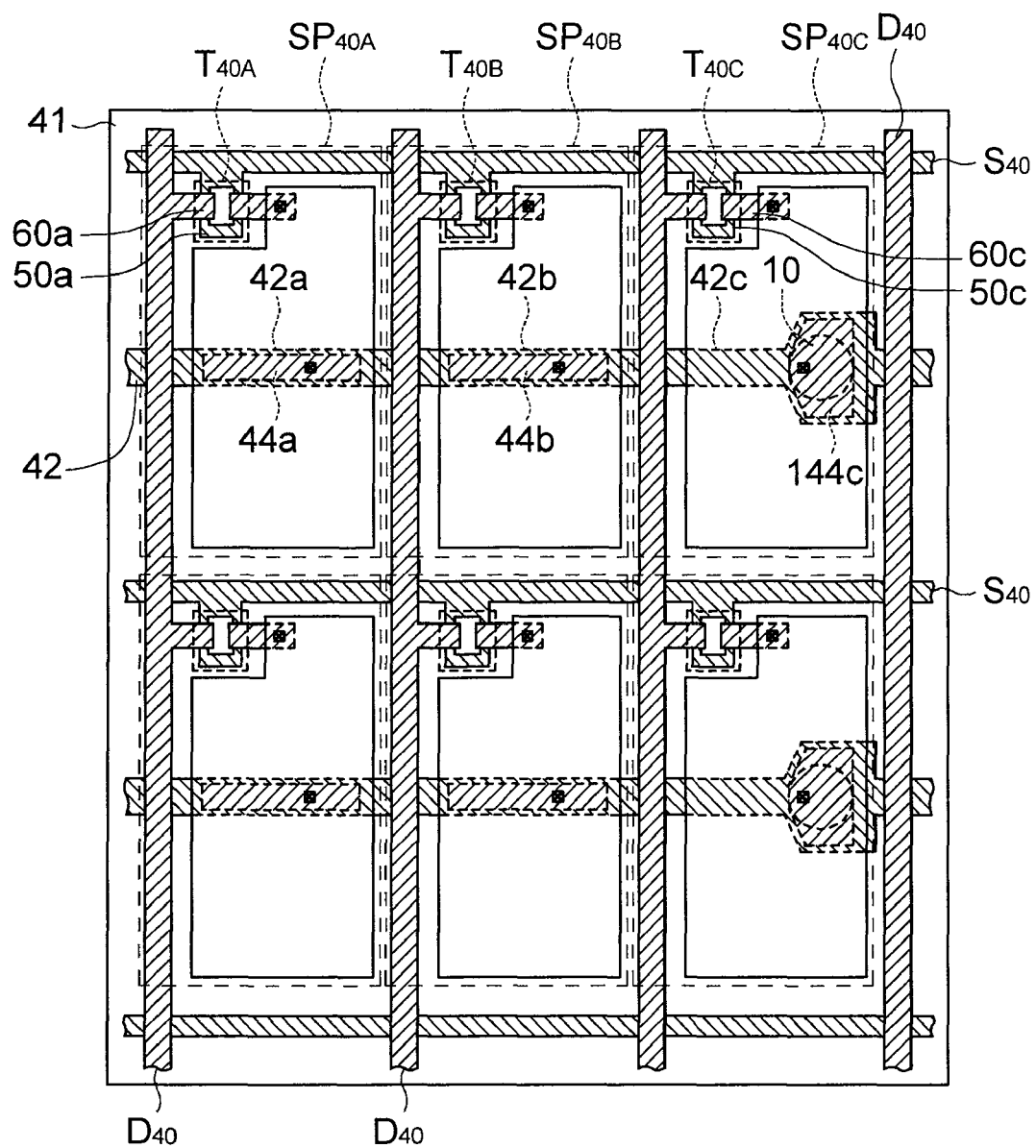
FIG. 6 is a top view showing a pixel array substrate according to a second embodiment.

FIG. 6 is a top view showing a pixel array substrate according to a second embodiment. In FIG. 6, several capacitor electrodes, including the first capacitor electrode 44a, the second capacitor electrode 44b and the third capacitor electrode 144c, are respectively disposed over the first conductive part 42a, the second conductive part 42b and the third conductive part 42c. The capacitor electrodes 44a, 44b and 144c are capacitively coupled with the conductive parts 42a, 42b and 42c to form a plurality of pixel storage capacitors $C_{ST-A}$, $C_{ST-B}$ and $C_{ST-C}$ (not numbered in the drawings). In one or more configurations, the maximum width of the third capacitor electrode 144c as measured perpendicular to the lengthwise direction of the patterned conductive layer 42 is greater than the corresponding maximum width of each of the first capacitor electrode 44a and the second capacitor electrode 44b. Moreover, although the third capacitor electrode 144c has a shape different from that of each of the first capacitor electrode 44a and the second capacitor electrode 44b, the area of the third capacitor electrode 144c is substantially the same as that of each of the first capacitor electrode 44a and the second capacitor electrode 44b. Consequently, a suitable space above the third capacitor electrode 144c is provided so that the spacer 10c may be disposed on the pixel array substrate 40. In addition, the coupled area $A_{ST-C}$ between the third capacitor electrode 144c and the third conductive part 42c is maintained substantially the same as the coupled areas $A_{ST-A}$ and $A_{ST-B}$ such that the feed-through voltages in three sub-pixel regions can be unified without the need of adjusting the coupled areas and the capacitors between the respective drains and gates, and the object of preventing flickering can be achieved. In addition, the pixel array substrate in the second embodiment may also be assembled into the liquid crystal display in a manner similar to that of the first embodiment.

Further Embodiments

Figure 7:
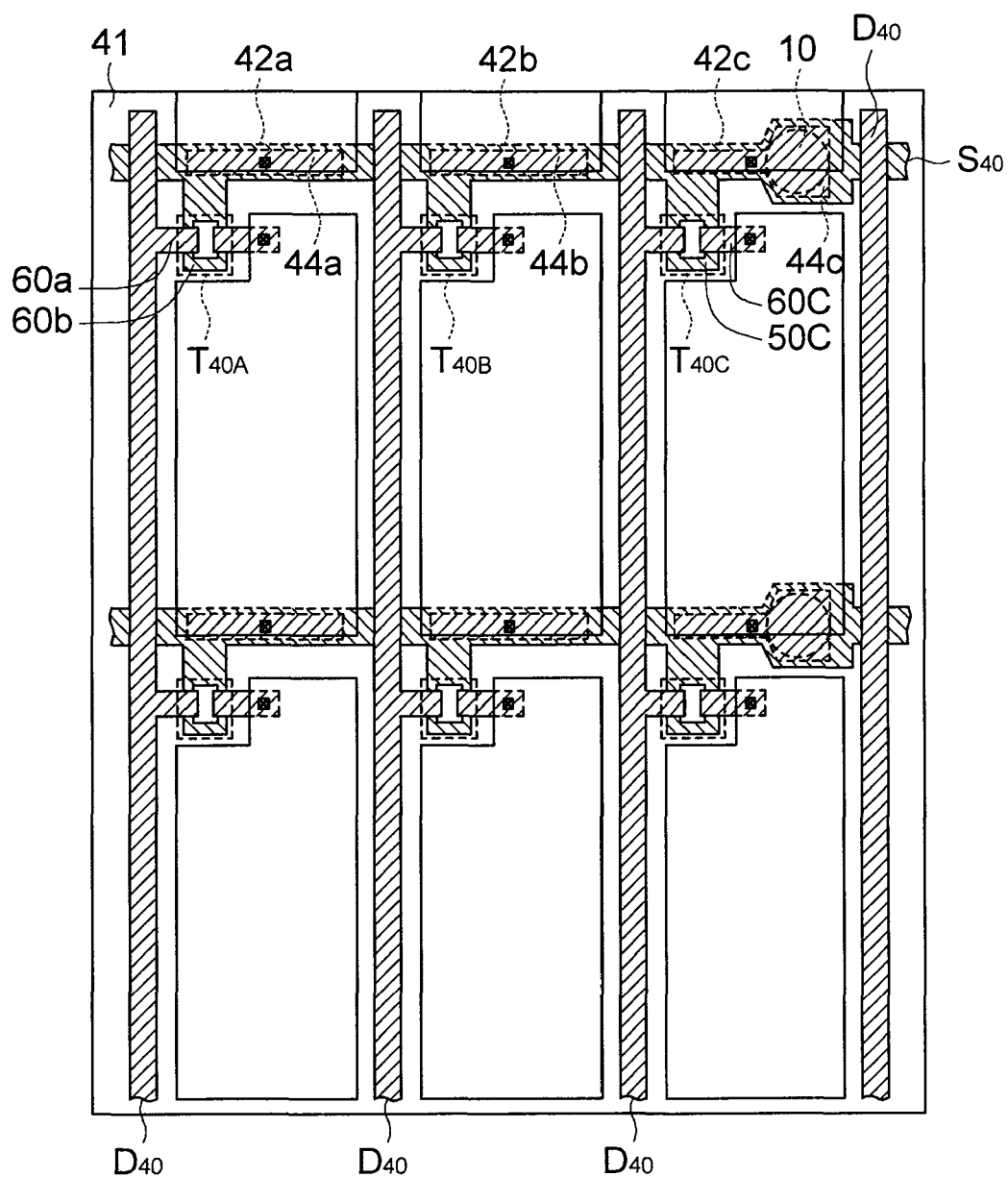
FIGS. 7-8 are views similar to FIGS. 4 and 6, respectively, and showing further embodiments.
Figure 8:
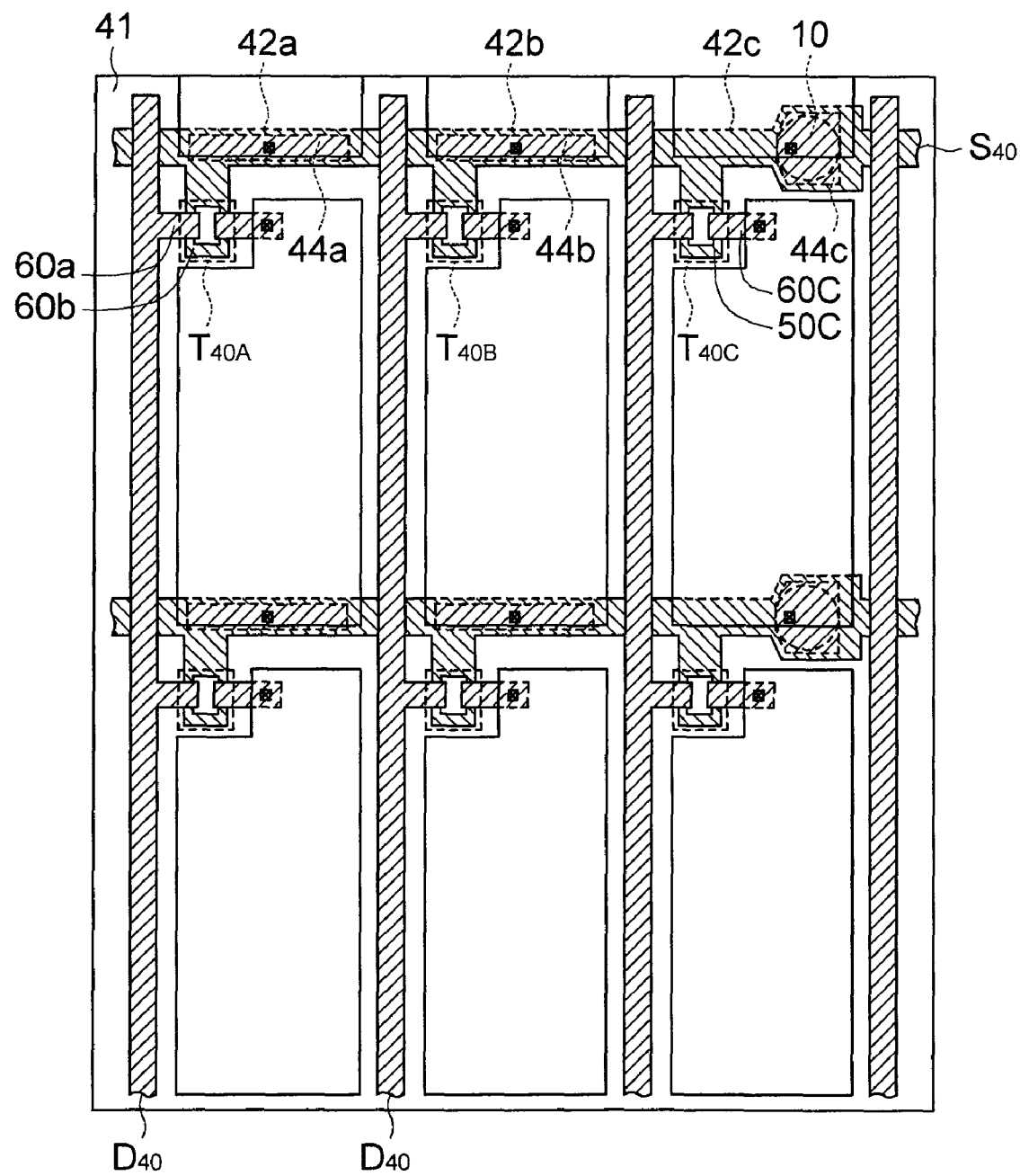

In the pixel array substrate and the liquid crystal display according to the above disclosed embodiments, the patterned conductive layer 42 serves as the common line. However, the patterned conductive layer 42, in one or more embodiments, may serve as a scan line $S_{40}$ so as to obtain a pixel array design with "storage capacitor on the scan line (Cs on gate)" as exemplarily shown in FIGS. 7-8. In each of FIGS. 7-8, a scan line $S_{40}$ (e.g., the lower scan line $S_{40}$ in FIG. 4), which is adjacent to the scan line $S_{40}$ currently being scanned (i.e., the one that currently provides the turn-on voltage, for example, the upper scan line $S_{40}$ in FIG. 4), functions as the original common line (i.e., being written with the common voltage), and is capacitively coupled with the respective capacitor electrode in the upper row to form the pixel storage capacitor $C_{ST}$. Thus, the space of the common line may be further saved, and thereby the greater pixel aperture ratio may be further provided. This "Cs on gate" design is applicable to the pixel array substrate and the liquid crystal display in the above-mentioned first and second embodiments, as exemplarily illustrated in FIGS. 7-8, respectively, except that the capacitor electrodes and the spacers are now disposed in correspondence with the scan lines, while other structures being substantially the same as in the specific descriptions of the first and second embodiments. Further detailed descriptions will therefore be omitted.

According to the pixel array substrate, the liquid crystal display and the method of preventing the liquid crystal display from flickering in accordance with one or more embodiments, only the size and/or shape of the capacitor electrode in the sub-pixel region, where the spacer is disposed, is changed to provide a sufficient area for the spacer while achieving the effect of maximizing the aperture ratio. The coupled area between the capacitor electrode and the respective conductive part in the sub-pixel region, where the spacer is disposed, is either the same as in the other sub-pixel regions or increased. Furthermore, when the pixel storage capacitor of the third sub-pixel region is correspondingly increased, all the feed-through voltages of the sub-pixel regions can still be unified by adjusting the capacitors between the respective gates and drains so that the problem of flickering of the liquid crystal display may be avoided. Moreover, the spacer is disposed, in one or more configurations, in the blue sub-pixel region to reduce any negative influence on the overall display quality.

While the disclosure has been described by way of example, it is to be understood that the disclosure should not be limited thereto. On the contrary, it is intended to encompass various modifications and similar arrangements and procedures.

What is claimed is:

1. A liquid crystal display, comprising:
  a pixel array substrate, which comprises:
    a substrate;
    a plurality of scan lines and a plurality of data lines formed on the substrate, wherein the scan lines intersect the data lines to define a plurality of sub-pixel regions comprising, for each pixel of the display, a first sub-pixel region, a second sub-pixel region and a third sub-pixel region;
    a patterned conductive layer, formed on the substrate, the patterned conductive layer comprising a first conductive part, a second conductive part and a third conductive part respectively disposed in the first sub-pixel region, the second sub-pixel region and the third sub-pixel region; and
    a plurality of capacitor electrodes, comprising a first capacitor electrode, a second capacitor electrode and a third capacitor electrode respectively disposed over the first conductive part, the second conductive part and the third conductive part to form first, second and third pixel storage capacitors, respectively, wherein at least one of (i) a shape or (ii) a maximum width of the third capacitor electrode as measured across a length-wise direction of the patterned conductive layer is different from that of the first capacitor electrode or the second capacitor electrode;
  a spacer disposed over the third capacitor electrode;
  an opposing substrate disposed on the spacer; and
  a liquid crystal layer filled in between the opposing substrate and the pixel array substrate.

2. The liquid crystal display according to claim 1, wherein a shape of the third conductive part is different from that of the first conductive part or the second conductive part, and a maximum width of the third conductive part as measured across the length-wise direction of the patterned conductive layer is greater than that of the first conductive part or the second conductive part.

3. The liquid crystal display according to claim 1, wherein the shape of the third capacitor electrode is different from that of the third conductive part.

4. The liquid crystal display according to claim 3, wherein coupled areas between the first, second and third capacitor electrodes and the first, second and third conductive parts, respectively, are substantially identical.

5. The liquid crystal display according to claim 1, wherein the first sub-pixel region is a red sub-pixel region, the second sub-pixel region is a green sub-pixel region, and the third sub-pixel region is a blue sub-pixel region.

6. The liquid crystal display according to claim 5, wherein the opposing substrate further comprises a red filter layer, a green filter layer and a blue filter layer, and the red filter layer, the green filter layer and the blue filter layer respectively correspond to the first sub-pixel region, the second sub-pixel region and the third sub-pixel region when the opposing substrate and the pixel array substrate are assembled together.

7. The liquid crystal display according to claim 1, wherein a first or second coupled area between (a) the first or second capacitor electrode and (b) the first or second conductive part, respectively, is different from a third coupled area between the third capacitor electrode and the third conductive part.

8. The liquid crystal display according to claim 7, wherein the shape of the third capacitor electrode is substantially the same as that of the third conductive part.

9. The liquid crystal display according to claim 7, wherein the third coupled area is larger than both the first and second coupled areas.

10. The liquid crystal display according to claim 9, further comprising:
  a plurality of transistors correspondingly formed in the sub-pixel regions, wherein each of the transistors comprises a gate and a drain formed thereon, the transistors comprise a first transistor, a second transistor and a third transistor correspondingly formed in the first sub-pixel region, the second sub-pixel region and the third sub-pixel region, wherein a coupled area between the drain and the gate of the third transistor is larger than those of the first and second transistors.

11. The liquid crystal display according to claim 1, wherein a footprint of the spacer is substantially entirely disposed within an area of the third capacitor electrode.

12. A liquid crystal display, comprising:
  a pixel array substrate, which comprises:
    a substrate;
    a plurality of scan lines and a plurality of data lines formed on the substrate, wherein the scan lines intersect the data lines to define a plurality of sub-pixel regions comprising, for each pixel of the display, a first sub-pixel region, a second sub-pixel region and a third sub-pixel region, wherein said first, second and third sub-pixel regions comprise first, second and third conductive parts, respectively;
    a plurality of capacitor electrodes, comprising a first capacitor electrode, a second capacitor electrode and a third capacitor electrode disposed over the first, second and third conductive parts in the first, second and third sub-pixel regions, respectively, to form first, second and third pixel storage capacitors, respectively, wherein at least one of a shape or a size of the third capacitor electrode is different from that of the first capacitor electrode or the second capacitor electrode; and
a spacer disposed over the third capacitor electrode;
an opposing substrate disposed on the spacer; and
a liquid crystal layer filled in between the opposing substrate and the pixel array substrate.

13. The liquid crystal display according to claim 12, wherein coupled areas between the first, second and third capacitor electrodes and the first, second and third conductive parts, respectively, are substantially identical.

14. The liquid crystal display according to claim 12, wherein a first or second coupled area between (a) the first or second capacitor electrode and (b) the first or second conductive part, respectively, is different from a third coupled area between the third capacitor electrode and the third conductive part.

15. The liquid crystal display according to claim 12, wherein the first, second and third conductive parts are defined by one of the scan lines that is adjacent the scan line associated with the first, second and third sub-pixel regions, and wherein said adjacent scan line is configured to receive a common voltage when the first, second and third sub-pixel regions are being scanned by the associated scan line.

16. The liquid crystal display according to claim 12, further comprising a patterned conductive layer which is other than the scan lines and the data lines, and is formed on the substrate to define said first, second and third conductive parts.

17. A liquid crystal display, comprising:
a pixel array substrate, which comprises:
a substrate;
a plurality of scan lines and a plurality of data lines formed on the substrate, wherein the scan lines intersect the data lines to define a plurality of sub-pixel regions comprising, for each pixel of the display, a first sub-pixel region, a second sub-pixel region and a third sub-pixel region;
a patterned conductive layer, formed on the substrate, the patterned conductive layer comprising a first conductive part, a second conductive part and a third conductive part respectively disposed in the first sub-pixel region, the second sub-pixel region and the third sub-pixel region; and
a plurality of electrodes, comprising a first electrode, a second electrode and a third electrode respectively disposed over the first conductive part, the second conductive part and the third conductive part to form a plurality of pixel storage capacitors, wherein a shape of the third electrode is different from that of the first electrode or the second electrode;
a spacer disposed in the third sub-pixel region; and
an opposing substrate disposed on the spacer.

18. The liquid crystal display according to claim 17, wherein the first sub-pixel region is a red sub-pixel region, the second sub-pixel region is a green sub-pixel region, and the third sub-pixel region is a blue sub-pixel region.

19. The liquid crystal display according to claim 17, wherein a coupled area between the first electrode and the first conductive part or between the second electrode and the second conductive part is different from a coupled area between the third electrode and the third conductive part.

20. The liquid crystal display according to claim 17, wherein the opposing substrate further comprises a red filter layer, a green filter layer and a blue filter layer, and the red filter layer, the green filter layer and the blue filter layer respectively correspond to the first sub-pixel region, the second sub-pixel region and the third sub-pixel region when the opposing substrate and the pixel array substrate are assembled together.

* * * * *